United States Patent
Wu et al.

(10) Patent No.: US 6,649,016 B2
(45) Date of Patent: Nov. 18, 2003

(54) SILANE FUNCTIONAL ADHESIVE COMPOSITION AND METHOD OF BONDING A WINDOW TO A SUBSTRATE WITHOUT A PRIMER

(75) Inventors: Ziyan Wu, Farmington Hills, MI (US); Daniel P. Heberer, Rochester Hills, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/090,848

(22) Filed: Mar. 4, 2002

(65) Prior Publication Data

US 2003/0173026 A1 Sep. 18, 2003

(51) Int. Cl.[7] ............................................. C09J 183/16
(52) U.S. Cl. .................... 156/329; 428/428; 528/17; 528/18; 528/23; 528/35
(58) Field of Search ....................... 528/17, 18, 23, 528/35; 156/329; 428/428

(56) References Cited

U.S. PATENT DOCUMENTS

| | | | |
|---|---|---|---|
| 3,502,704 A | 3/1970 | McKeller | 260/448.8 |
| 3,627,722 A | 12/1971 | Seiter | 260/37 N |
| 3,707,521 A | 12/1972 | De Santis | 260/37 N |
| 3,779,794 A | 12/1973 | De Santis | 117/72 |
| 3,886,226 A | 5/1975 | Asai et al. | 260/77.5 AM |
| 3,971,751 A | 7/1976 | Isayama et al. | 260/37 |
| 3,979,344 A | 9/1976 | Bryant et al. | 260/18 |
| 4,222,925 A | 9/1980 | Bryant et al. | 260/37 N |
| 4,284,751 A | 8/1981 | Hutt et al. | 528/45 |
| 4,302,571 A | 11/1981 | Arai et al. | 528/32 |
| 4,345,053 A | 8/1982 | Rizk et al. | 525/440 |
| 4,367,313 A | 1/1983 | Rizk et al. | 525/102 |
| 4,374,237 A | 2/1983 | Berger et al. | 528/28 |
| 4,396,681 A | 8/1983 | Rizk et al. | 428/423.1 |
| 4,399,261 A | 8/1983 | Kato et al. | 525/342 |
| 4,444,974 A | 4/1984 | Takase et al. | 528/33 |
| 4,474,933 A | 10/1984 | Huber et al. | 528/26 |
| 4,507,437 A * | 3/1985 | Kato et al. | 525/106 |
| 4,507,469 A | 3/1985 | Mita et al. | 528/425 |
| 4,525,511 A | 6/1985 | Kirby et al. | 524/158 |
| 4,539,345 A | 9/1985 | Hansen | 523/114 |
| 4,555,561 A | 11/1985 | Sugimori et al. | 528/26 |
| 4,567,228 A | 1/1986 | Gaa et al. | 524/588 |
| 4,571,278 A | 2/1986 | Kunert | 156/108 |
| 4,582,873 A | 4/1986 | Gaa et al. | 524/591 |
| 4,618,656 A | 10/1986 | Kawakubo et al. | 525/404 |
| 4,622,369 A | 11/1986 | Chang et al. | 525/440 |
| 4,623,738 A | 11/1986 | Sugerman et al. | 556/17 |
| 4,625,012 A | 11/1986 | Rizk et al. | 528/28 |
| 4,645,816 A | 2/1987 | Pohl et al. | 528/28 |
| 4,650,835 A | 3/1987 | Eck et al. | 525/440 |
| 4,657,978 A * | 4/1987 | Wakabayashi et al. | 525/100 |
| 4,687,533 A | 8/1987 | Rizk et al. | 156/307.3 |
| 4,720,536 A | 1/1988 | House et al. | 528/60 |
| 4,758,648 A | 7/1988 | Rizk et al. | 528/53 |
| 4,788,170 A | 11/1988 | Wengrovius | 502/152 |
| 4,788,254 A | 11/1988 | Kawakubo et al. | 525/100 |
| 4,837,274 A | 6/1989 | Kawakubo et al. | 525/100 |
| 4,837,401 A | 6/1989 | Hirose et al. | 525/364 |
| 4,889,903 A | 12/1989 | Baghdachi | 528/17 |
| 4,906,707 A | 3/1990 | Yukimoto et al. | 525/403 |
| 4,954,598 A | 9/1990 | Baghdachi et al. | 528/22 |
| 4,963,614 A | 10/1990 | Ito et al. | 528/28 |
| 4,963,636 A | 10/1990 | Mulhaupt et al. | 528/28 |
| 4,965,311 A | 10/1990 | Hirose et al. | 524/483 |
| 4,977,228 A | 12/1990 | Wakabayashi et al. | 528/12 |
| 5,011,900 A | 4/1991 | Yukimoto et al. | 525/477 |
| 5,063,270 A | 11/1991 | Yukimoto et al. | 524/306 |
| 5,068,304 A | 11/1991 | Higuchi et al. | 528/28 |
| 5,147,927 A | 9/1992 | Baghdachi et al. | 524/710 |
| 5,194,460 A | 3/1993 | Evans et al. | 523/211 |
| 5,223,583 A | 6/1993 | Higuchi et al. | 525/404 |
| 5,223,597 A | 6/1993 | Iwakiri et al. | 528/31 |
| 5,272,224 A | 12/1993 | Baghdachi et al. | 525/460 |
| 5,330,597 A | 7/1994 | Leuchten et al. | 156/108 |
| 5,342,867 A | 8/1994 | Ryan et al. | 524/101 |
| 5,342,914 A | 8/1994 | Iwakiri et al. | 528/32 |
| 5,403,881 A | 4/1995 | Okawa et al. | 524/261 |

(List continued on next page.)

FOREIGN PATENT DOCUMENTS

| | | | |
|---|---|---|---|
| EP | 0 070 475 A2 | 1/1983 | C08G/18/71 |
| EP | 0 158 893 | 10/1985 | C08G/18/12 |
| EP | 0 082 528 B1 | 4/1986 | C08G/18/10 |
| EP | 0 363 006 A2 | 4/1990 | C08J/3/24 |
| EP | 0 450 105 B1 | 10/1991 | |
| EP | 0 525 769 A1 | 7/1992 | C08G/65/32 |
| EP | 0 532 048 A1 | 9/1992 | C08G/65/32 |
| EP | 0 538 880 B1 | 10/1992 | C08G/65/32 |
| EP | 0 546 310 A2 | 6/1993 | C08G/65/32 |
| EP | 0 532 048 B1 | 8/1996 | |
| EP | 0 819 749 A2 A3 | 1/1998 | C09D/133/26 |
| EP | 0 533 275 B1 | 12/1998 | C08G/64/02 |
| EP | 0 538 880 B1 | 3/1999 | C08G/65/32 |
| EP | 0 525 769 B1 | 9/1999 | C08G/65/32 |
| EP | 0 856 569 B1 | 6/2002 | C09K/3/10 |
| JP | 2-36260 | 2/1990 | C08L/71/102 |
| WO | 94/18255 | 8/1994 | C08J/18/10 |
| WO | 98/18843 | 10/1997 | C08G/18/10 |
| WO | 99/55755 | 4/1999 | C08G/18/71 |
| WO | 99/55794 | 4/1999 | C08J/201/10 |

OTHER PUBLICATIONS

Chemical Abstract, 127:347136k, Ultraviolet–curing adhesive compositions for optical disks and article, Tokuda et al., vol. 127, No. 25, 1997.

(List continued on next page.)

Primary Examiner—Robert Dawson
Assistant Examiner—Marc S. Zimmer

(57) ABSTRACT

This invention relates to silane functional adhesive composition and to a method of bonding a window to a painted substrate using the adhesive without the need for a primer for the painted substrate. In one embodiment, the invention is a method of bonding glass to a painted substrate, such as a window in a vehicle. The process comprises applying to the glass or the unprimed painted substrate an adhesive as described herein; contacting the glass with the unprimed painted substrate wherein the adhesive is located between the window and the substrate; and allowing the adhesive to cure.

16 Claims, No Drawings

U.S. PATENT DOCUMENTS

| | | | |
|---|---|---|---|
| 5,409,995 A | 4/1995 | Iwahara et al. | 525/100 |
| 5,476,889 A | 12/1995 | Owen | 524/170 |
| 5,500,464 A | 3/1996 | Homma et al. | 523/435 |
| 5,539,045 A | 7/1996 | Potts et al. | 524/588 |
| 5,541,266 A | 7/1996 | Hasegawa et al. | 525/403 |
| 5,554,686 A | 9/1996 | Frisch, Jr. et al. | 524/588 |
| 5,554,709 A | 9/1996 | Emmerling et al. | 528/27 |
| 5,567,833 A | 10/1996 | Iwahara et al. | 556/434 |
| 5,623,044 A | 4/1997 | Chiao | 528/28 |
| 5,650,467 A | 7/1997 | Suzuki et al. | 525/100 |
| 5,672,652 A | 9/1997 | Bhat | 524/590 |
| 5,741,383 A | 4/1998 | Kneisel | 156/108 |
| 5,744,543 A | 4/1998 | Huver et al. | 524/728 |
| 5,910,555 A | 6/1999 | Ueda et al. | 528/34 |
| 5,952,052 A | 9/1999 | Hattori et al. | 427/387 |
| 6,025,416 A | 2/2000 | Proebster et al. | 523/333 |
| 6,255,434 B1 | 7/2001 | McGraw et al. | 528/92 |

OTHER PUBLICATIONS

Chemical Abstract, 124:31204c, Curable polymer compositions, Higuchi et al., vol. 124, No. 4, 1996.
Chemical Abstract, 111:99087d, Anticorrosive and antisoiling nitrogen–containing vinyl polymer coatings for galvanized steel of paved roads, Masuda et al., vol. 111, 1989.
Chemical Abstract, 111:234606q (unavailable), claims for Patent No. 234606 is included.
Chemical Abstract, 127:34958z, Hardenable compositions of reactive silyl–substituted polyoxyalkylenes and epoxy resins applicable by spraying, vol. 127. No. 3, 1997.
Chemical Abstract, 127:18588y, Hydrolyzable silyl–terminated propylene oxide polymer compositions curable by moisture at room temperature and giving delustered cured products, Murayama et al., vol. 127. No. 2, 1997.
Chemical Abstract, 127:96052h, Moisture fast curable silicone resin composition, Yotsuyanagi, vol. 127, No. 7, 1997.
Chemical Abstract, 128:62547d, Silicon–containing acrylic polymer adhesive curable compositions, Matsumoto et al, vol. 128, No. 6, 1998.
Chemical Abstract, 127:332526p, Curing compositions with improved adhesion strength, Murohashi et al., vol. 127. No. 24, 1997.
Chemical Abstract, 123:288410n, Curable compositions for cured products with good mechanical properties and adhesion strength for sealants and adhesives, vol. 123, 1995.
Chemical Abstract, 124:203936m, Curable resin compositions with adhesive durability, useful for sealing materials, etc, Higuchi et al, vol. 124. No. 16, 1996.
Chemical Abstract, 125:12432e, Curable silyl–containing polyether compositions with improved adhesion strength and mechanical properties, Higuchi et al, vol. 125, No. 2, 1996.
Chemical Abstract, 126:32180v, Manufacture of moisture–curable polyurethane compositions containing hydrolyzable silyl group containing compounds and curable compositions therefrom, vol. 126, No. 3, 1997.
Chemical Abstract, 125:331084q, Polyoxyalkylene–silicone rubber sealing and adhesive compositions curable by moisture at room temperature, Murayama et al., vol. 125, No. 26, 1996.
Chemical Abstract, 118:104580k, Curable hydrolyzable group–containing polyoxypropylene compositions, Fujita et al, vol. 118, 1993.
Chemical Abstract, 121:135901g, Room–temperature–curable compositions, Toda et al., vol. 121, 1994.
Chemical Abstract, 123:58499u, Moisture–curable compositions, Yamamoto et al, vol. 123, 1995.
Chemical Abstract, 123:114600j, Moisture–curable resin compositions, Yamaguchi, vol. 123, 1995.
Chemical Abstract, 123:259569r, Room–temperature–curable polyether compositions for sealants and adhesives, Higuchi et al, vol. 123, 1995.
Chemical Abstract, 103:72706c, Curable compositions, Sango Chemical Industries, vol. 103,1985.
Chemical Abstract, 104:225770s, Moisture–curable compositions, Katsuno, vol. 104, 1986.
Chemical Abstract,109:94444s, Adhesives for automobile side molding strips, Yamagishi, et al., vol. 109, 1988.
Chemical Abstract, 116:130726r, Moisture–curable, primerless polyurethane sealants for glass panels, Baghdachi et al., vol. 116, 1992.
Chemical Abstract, 98:162252j, Moisture–curable silicone rubber compositions, Kanegafuchi Chemical Industry.
Chemical Abstract, 101:231637h, Pressure–Sensitive adhesive tapes, Kanegafuchi Chemical Industry Co. Ltd., vol. 101, 1984.
Chemical Abstract, 130:111312a, Single–component compositions with reactive system containing moisture–hardenable, alkoxysilane–terminated polyurethanes and their manufacture and use, Emmerling et al., vol. 103. No. 9, 1999.
Chemical Abstract, 103:125207z, Vulcanizable sealant compositions, Bryant et al., vol. 103, 1985.
Chemical Abstract, 104:90652g, Silane–containing isocyanate prepolymers, Chow et al., vol. 104, 1986.
Chemical Abstract, 131:338014z, Cure on demand adhesives and window module using cure on deman adhesive, Mahdi et al., vol. 131. No. 25, 1999.
Chemical Abstract, 129:317333w, Silyl–modified polymer compositions for storage–stable curable adhesives, Shiyanagi et al., vol. 129. No. 24, 1998.
Chemical Abstract, 129:96480n, Compression–elastic foamable material based on silane–modified polymer, Proebster et al., vol. 129.
Derwent 95–041548/06, JP 06322351–A, Sekisui Chem Ind Co. Ltd.
Derwent 92–425079/52, DE 4119484–A, Teroson GmbH, Proebster.
Chemical Abstract 123:171406z, Room–temperature–curable adhesives containing alkoxysilyl–terminated polyoxyalkylene derivatives, Inoe, vol. 123, 1995.
Derwent 98–551255/47, JP 10245482–A, Konishi Co. Ltd.
Derwent 99–287967/24, WO 9919405–A1, Kaneka Corporation.
Derwent 99–210989/18, JP 11049970–A, Asahi Glass Co. Ltd.
J. Adhes. Sealant Counc., Shayne J. Landon et al., "The Adhesion of Hybrid Sealants to Plastic Substrates", 1996 (Nov. vol. 1) 21–36.
Double–Liaison–Phys., Chim. Econ. Peint. Adhes, Shayne J. Landon et al., The Adhesion of Hybrid Sealants to Plastic Substrates, 1997 44(500), 32–36.
MS—Polymertechnologie: MS Polymer Technology, Dr. IR. Richard Oosting, "Opportunities to reduce environmental problems together with a reduction of the manufacturing costs".
What is Kaneka MS Polymer and Kaneka Silyl?; Kaneka Corporation, pp. 1–15.
Derwent JP 5309 2857, Furukawa Electric Co. Ltd., 1978.

\* cited by examiner

SILANE FUNCTIONAL ADHESIVE COMPOSITION AND METHOD OF BONDING A WINDOW TO A SUBSTRATE WITHOUT A PRIMER

BACKGROUND OF THE INVENTION

This invention relates to silane functional adhesive composition and to a method of bonding a window to a painted substrate using the adhesive without the need for a primer for the painted substrate.

Polyurethane sealant compositions are used for bonding non-porous substrates, such as glass, to nonporous substrates, these are described in U.S. Pat. No. 4,374,237 and U.S. Pat. No. 4,687,533, both incorporated herein by reference. U.S. Pat. No. 4,374,237 describes a polyurethane sealant containing urethane prepolymers which have been further reacted with secondary amine compounds containing two silane groups. U.S. Pat. No. 4,687,533 describes a polyurethane sealant containing urethane prepolymers which contain silane groups which have been prepared by reacting a polyisocyanate having at least three isocyanate groups with less than an equivalent amount of an alkoxysilane having a terminal group containing active hydrogen atoms reactive with isocyanate groups to form an isocyanatosilane having at least two unreacted isocyanate groups. In a second step, the isocyanatosilane is mixed with additional polyisocyanate and the mixture is reacted with a polyol to form a polyurethane prepolymer having terminal isocyanato groups and pendant alkoxysilane groups. EP 856,569 discloses the use of polyoxyalkylene polymer terminated with silanes having hydrolyzable groups bonded thereto blended with a polyoxyalkylene polymer having no cross-linking groups to bond glass to metal.

However, when such sealants are used to bond glass substrates to painted substrates, such as for window installation in vehicle manufacturing, the lap shear strength of the bonded substrate may be less than desirable for safety or structural purposes. Consequently, a separate paint primer comprising a solution of one or more silanes is typically applied to a painted substrate prior to the application of the sealant in most vehicle assembly operations for bonding the windshield and the rear window. The use of a primer in assembly operations is undesirable in that it introduces an extra step, additional cost, the risk of marring the paint surface if dripped on an undesired location and exposes the assembly line operators to additional chemicals.

U.S. Pat. No. 5,147,927 discloses an adhesive which can bond to the electrocoat primer layer without the need to prime the electrocoat surface. The adhesive is used in a process which requires masking the area where the glass window will be bonded into a vehicle before the painting process, removing the masking after painting and then bonding the glass to the previously masked area. The adhesive comprises a silane capped polyurethane polymer and an aminosilane electrocoat adhesion promoter. The composition described may further include standard silanol curing catalyst, including tin catalysts, and an accelerating agent of titanate esters, with amine substituted titinate esters preferred. The problem with this process is that the sealant does not bond to the painted surface without a primer and requires extra steps in masking the bond area.

Automotive OEMs have demanded that the paint suppliers provide more robust acid resistant paint systems which stand up to harsh environmental conditions. These paint systems are difficult to bond to due to the increased chemical resistance of the paints. One problem with developing an adhesive which bonds to these paint systems on an automobile is that there are several different paint chemistries. The automobile producers also demand an adhesive for bonding glass into a vehicle which cures rapidly so that the vehicle can be moved without the glass falling out or slipping from the desired location. Additionally, it is important that the adhesive demonstrate stability prior to application, that is does not cure before being applied to bond the glass into the vehicle. If the adhesive cures in the delivery system in the auto plant, the assembly time must be shut down while the adhesive delivery system is purged. Such a shut down is very costly for the automotive companies and must be avoided. In addition to the above needs, such adhesives need to demonstrate rapid cure upon exposure to ambient conditions and good stability before application. In addition the adhesive needs to bond, or link up, to the unprimed painted surface as soon as possible so the risk of the window moving from where it is placed is reduced. Automobiles last upwards of 10 years and the adhesive needs to maintain its' integrity and hold the window into the vehicle for the life of the vehicle under a variety of difficult conditions. Thus what is needed is an adhesive which can be applied to the automotive paints especially difficult to bond to paints, to bond glass into a vehicle without the need to use a primer, which adhesive also demonstrates strong adhesion, adhesive strength rapid cure, fast link-up, good stability and long term durability.

SUMMARY OF THE INVENTION

The invention is an adhesive composition comprising A) one or more polymers having a flexible backbone and silane moieties capable of silanol condensation; B) one or more titanates or zirconates having one or more ligands comprising hydrocarbyl phosphate esters and/or a hydrocarbyl sulfonate esters; and C) an anhydrous strong organic acid which is miscible with the polymer and enhances the bonding of the adhesive to a coated substrate in the absence of a primer.

In one embodiment, the invention is a method of bonding glass to a painted substrate, such as a window in a vehicle. The process comprises applying to the glass or the unprimed coated substrate an adhesive as described herein; contacting the glass with the unprimed coated substrate wherein the adhesive is located between the window and the substrate; and allowing the adhesive to cure.

The adhesive and method of the invention allows the bonding of glass to a coated substrate without the need for priming the surface of the substrate to which it is bonded. This is especially useful for bonding windows into automobiles. The adhesive further demonstrates excellent adhesive and cohesive strength, excellent stability before application, rapid cure rate, rapid link up and long term durability.

DETAILED DESCRIPTION OF THE INVENTION

The adhesive composition of the invention contains a polymer having a flexible backbone and having silane moieties capable of silanol condensation. The polymer with a flexible backbone can be any polymer with a flexible backbone which can be functionalized with a silane capable of silanol condensation. Among preferred polymer backbones are polyethers, polyurethanes, polyolefins and the like. Among more preferred polymer backbones are the polyethers and polyurethanes, with the most preferred being the polyethers. Even more preferably the polymer is a polyether having silane moieties capable of silanol condensation. In one embodiment, the polymer useful in the invention is a polymer as disclosed in Yukimoto et al., U.S. Patent 4,906707; Iwakiri et al., U.S. Pat. No. 5,342,914; Yukimoto U.S. Pat. No. 5,063,270; Yukimoto et al., U.S. Pat. No. 5,011,900; Suzuki et al. U.S. Pat. No. 5,650,467, all incorporated herein by reference. More preferably such polymers are oxyalkylene polymers containing at least one reactive silicon group per molecule. The oxyalkylene polymer which can be used in the present invention includes polymers having a molecular chain represented by formula (1):

$$—(R—O)_n—$$ (1)

wherein R represents a divalent alkylene group having 2 to 4 carbon atoms, and preferably 2 to 3 carbon atoms; and n represents the number of repeating units. The oxyalkylene polymer may have a straight chain or a branched structure, or a mixed structure thereof. From the viewpoint of availability an oxyalkylene polymer having a repeating unit represented by formula (2) is preferred:

$$—CH(CH_3)CH_2O—$$ (2)

The polymer may contain other monomer units but preferably comprises the monomer unit of formula (1) in a proportion of at least about 50 percent by weight, particularly about 80 percent by weight or more. Oxyalkylene polymers having a number average molecular weight (Mn) of about 1,000 or more are preferred. Those having a Mn of about 2,000 to about 50,000 are even more preferred, and about 2,000 to about 30,000, are most preferred.

The terminology "reactive silicon group" or "reactive silane capable of silanol condensation" means a silicon-containing group in which a hydrolyzable group or a hydroxyl group is bonded to the silicon atom and which is cross-linkable through silanol condensation reaction. While not limited thereto, typical reactive silicon groups are represented by formula (3):

(3)

wherein $R^1$ and $R^2$ each represent an alkyl group having 1 to 20 carbon atoms, an aryl group having 6 to 20 carbon atoms, an aralkyl group having 7 to 20 carbon atoms or a triorganosiloxy group represented by $(R')_3SiO—$, wherein each of the three R' groups, which may be the same or different represents a monovalent hydrocarbon group having 1 to 20 carbon atoms; when there are two or more of each of the $R^1$ or $R^2$ groups, each of the $R^1$ and $R^2$ groups may be the same or different, and the $R^1$ can be the same or different from $R^2$; X is independently in each occurrence a hydroxyl group or a hydrolyzable group; a is independently in each occurrence 0, 1, 2 or 3; and b is independently in each occurrence 0, 1 or 2; and m represents 0 or an integer of from 1 to 19; wherein a and b are chosen to satisfy the relationship $a+\Sigma b \geq 1$.

The hydrolyzable group represented by X is not particularly limited and is selected from conventional hydrolyzable groups. Specific examples are a hydrogen atom, a halogen atom, an alkoxy group, an acyloxy group, a ketoximate group, an amino group, an amido group, an acid amido group, an amino-oxy group, a mercapto group, and an alkenyloxy group. Preferred among them are a hydrogen atom, an alkoxy group, an acyloxy group, a ketoximate group, an amino group, an amido group, an amino-oxy group, a mercapto group, and an alkenyloxy group. An alkoxy group is more preferred with a methoxy or ethoxy group being most preferred, for ease in handling due to its mild hydrolyzability. One to three hydroxyl groups or hydrolyzable groups may be bonded to one silicon atom, and $(a+\Sigma b)$ is preferably 1 to 5. Where two or more hydroxyl groups or hydrolyzable groups are present per reactive silicon group, they may be the same or different. The reactive silicon group may have one or more silicon atoms. A reactive silicon group in which silicon atoms are linked to form siloxane bondings may have as much as 20 silicon atoms. From the standpoint of availability, reactive silicon groups represented by formula (4) shown below are preferred:

(4)

wherein $R^1$, X, and a are as defined above. $R^1$ is preferably an alkyl group, e.g., methyl or ethyl; a cycloalkyl group, e.g., cyclohexyl; an aryl group, e.g., phenyl; an aralkyl group, e.g., benzyl; or a triogansiloxy group of formula $(R')_3SiO—$ in which R' is methyl or phenyl. $R^1$ and R' are most preferably a methyl group.

The oxyalkylene polymer contains at least one, and preferably about 1.1 to about 6 reactive silicon groups per molecule. If the number of the reactive silicon group per molecule is less than 1, the polymer has insufficient curability, failing to achieve satisfactory rubbery elasticity. The reactive silicon group may be placed either at the terminal or in the inside of the molecular chain of the oxyalkylene polymer. An oxyalkylene polymer having the reactive silicon group at the molecular terminal thereof tends to provide a rubbery cured product having high tensile strength and high elongation.

In one embodiment, the flexible polymer used in the adhesive composition is a silyl terminated prepolymer prepared by contacting a polyol as described herein with an isocyanato silane having at least one silane moiety which has bonded thereto a hydrolyzable moiety under conditions such that the hydroxyl moieties of the polyol react with the isocyanate moieties of the isocyanatosilane so as to place a terminal silane moiety on the polyol, preferably the contacting is performed without addition of catalyst.

Polyols which may be used to prepare the silyl terminated prepolymer include polyols useful in preparing polyurethane prepolymers useful in adhesive and elastomer applications and are well known to those skilled in the art. Bhat et al., U.S. Pat. No. 5,672,652, see column 4, lines 5 to 60, (relevant parts incorporated herein by reference) discloses the preferred polyols useful in preparing the silane terminated prepolymers.

Preferably, the polyols used in preparing the silane terminated prepolymers are high molecular weight polyols prepared by the process which comprises first, contacting one or more initiators with one or more alkylene oxides in the presence of a catalyst comprising calcium having counterions of carbonate and a $C_6$ to $C_{10}$ alkanoate in a solvent which does not contain active hydrogen atoms as disclosed in U.S. Pat. No. 6,255,434 (incorporated herein by reference). Preferably the process is performed such that a polyol is prepared which has an equivalent weight of from about 1,000 to about 20,000, a polydispersity of about 1.2 or less and a residual calcium level of from about 0 to about 2,000 parts per million (ppm). Preferably the process is performed such that the amount of catalyst used is sufficient such that the residual catalyst remaining in the polyol upon completion of the reaction is about 0 part per million or greater, preferably about 1 part per million or greater, more preferably about 200 parts per million or greater, even more preferably about 300 parts per million or greater and most preferably about 400 parts per million or greater, and preferably about 2,000 parts per million or less, more preferably about 1,000 parts per million or less, even more preferably about 800 parts per million or less and most preferably about 400 parts per million or less. In some embodiments, it may be desirable to remove all of the residual catalyst where the catalyst is not needed for a further reaction and where the catalyst may impact the properties of the ultimate adhesive. The polyether polyol preferably has a weight average molecular weight of about 2,000 or greater, more preferably about 3,000 or greater, even more preferably about 6,000 or greater and most preferably about 10,000 or greater. The resulting polyether polyol preferably has a weight average molecular weight of about 20,000 or less, more preferably about 16,000 or less, even more preferably about 14,000 or less and most preferably about 12,000 or less. The resulting high molecular weight polyol preferably has a polydispersity of about 1.2 or less and more preferably about 1.12 or less. The polyols also demonstrate a low unsaturation level, preferably about 0.04 milliequivalent of unsaturation per gram of polyol or less and more preferably about 0.02 milliequivalent of unsaturation per gram of polyol or less.

Also included as useful polyols are polymers having a polyolefin backbone and terminal hydroxyl groups. Examples of such polyols are Kraton™ polyethylene/butylene polymers having terminal hydroxyls such as Kraton™ Liquid L-2203 polymer. Polyalkyleneoxide based polyether polyols prepared using double metal cyanide catalysts can also be used in this invention. They are especially attractive because of their low unsaturation level.

The polyols can be reacted with an isocyanato silane to prepare reactive silicone functional prepolymers. Such isocyanato silane requires a silane group with a hydrolyzable moiety attached thereto. Isocyanato silanes useful in the invention are described in U.S. Pat. No. 4,618,656 at column 3, lines 24 to 34, incorporated herein by reference. Preferably such isocyanato silanes correspond to Formula 5;

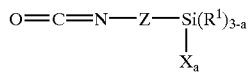
(5)

wherein a, $R^1$ and X are as defined hereinbefore. Z is independently in each occurrence, $C_{1-40}$ divalent hydrocarbyl moiety. Z is preferably a $C_{1-20}$ divalent hydrocarbyl moiety, preferably $C_{1-10}$ alkylene, more preferably $C_{1-3}$ alkylene and most preferably methylene.

The reaction of the polyol with an organo functional silane can be performed using conventional processes such as those disclosed in U.S. Pat. No. 4,625,012, incorporated herein by reference. The use of the high molecular weight polyols prepared using calcium catalysts as disclosed in U.S. Pat. No. 6,255,434 allow the preparation of silane terminated polyethers by the reaction of isocyanato silanes with the polyols without the addition of additional catalysts. The residual calcium catalyst from the polyol formation reaction sequence described above is sufficient to catalyze the reaction. If desired, a standard polyurethane catalyst such as those disclosed in U.S. Pat. No. 4,625,012 at column 5, lines 14 to 23, incorporated herein by reference, may be added. Where a high molecular weight polyol is used it is preferred that a sufficient amount of isocyanato silane be used to react with all of the hydroxyl functionality of the polyol. In this embodiment, the resulting prepolymer exhibits excellent physical properties and stability. Where the polyol used is a lower molecular weight polyol, it is desirable to use less than a stoichiometric amount of isocyanatosilane as compared to hydroxyl moieties, such that the resulting product has some residual hydroxyl moieties in the prepolymer prepared. This results in a product that has better physical properties at cure. In this embodiment, the ratio of hydroxyl moieties to isocyanate moieties of the isocyanoto silanes is preferably from about 0.75:1.0 to 0.95:1.0.

In another embodiment, the polymer is a polyurethane based polymer having hydrolyzable silane groups. Such materials are disclosed in Chang, U.S. Pat. No. 4,622,369 and Pohl, U.S. Pat. No. 4,645,816, relevant portions incorporated herein by reference.

In another embodiment, the backbone can be a flexible polymer such as a polyether or polyolefin, having silicon moieties having bound thereto. A flexible polymer with unsaturation can be reacted with a compound having a hydrogen or hydroxyl moiety bound to silicon wherein the silicon moiety also has one or more carbon chains with unsaturation. The silicon compound can be added to the polymer at the point of unsaturation by a hydrosilylation reaction. This reaction is described in Kawakubo, U.S. Pat. No. 4,788,254, column 12, lines 38 to 61; U.S. Pat. No. 3,971,751; U.S. Pat. No. 5,223,597; U.S. Pat. No. 4,923,927; U.S. Pat. No. 5,409,995 and U.S. Pat. No. 5,567,833, incorporated herein by reference.

The prepolymer is present in the adhesive composition in sufficient amount such that the adhesive is capable of bonding glass to another substrate, such as metal, plastic, a composite or fiberglass. Preferably the substrates are coated and more preferably the substrates are painted with acid resistant paints, such as acrylic melamine silane modified coatings, melamine carbamate coatings, two part urethane coatings, or acid epoxy cure coatings. The adhesives of the invention are especially good for bonding windows to the urethane acrylic melamine and the melamine carbamate paints. Preferably the prepolymer is present in an amount of about 30 parts by weight or greater based on the weight of the adhesive, more preferably about 40 parts by weight or greater, even more preferably about 45 parts by weight or greater and most preferably about 48 parts by weight or greater. Preferably the prepolymer is present in an amount of about 99.8 parts by weight or less based on the weight of the adhesive and most preferably about 85 parts by weight or less.

The adhesive composition may further comprise one or more tin catalysts which catalyzes the silanol condensation reaction. Tin catalysts useful for the silanol condensation reaction are well-known in the art. Among preferred tin compounds useful for silanol condensation are, dialkyltin (IV) salts of organic carboxylic acids, such as dibutyltin diacetate, dimethyl tin dilaurate, dibutyltin dilaurate, dibutyltin maleate or dioctyltin diacetate; tin carboxylates, such as tin octylate or tin naphthenate; reaction products of dialkyltin oxides and phthalic acid esters or alkane diones; dialkyltin diacetyl acetonates, such as dibutyltin diacetylacetonate (also commonly referred to as dibutyltin acetylacetonate); dialkyltinoxides, such as dibutyltinoxide; tin(II) salts of organic carboxylic acids, such as tin(II) diacetate, tin(II) dioctanoate, tin(II) diethylhexanoate or tin(II) dilaurate; dialkyl tin (IV) dihalides, such as dimethyl tin dichloride; and stannous salts of carboxylic acids, such as stannous octoate, stannous oleate, stannous acetate, or stannous laurate. These silanol condensation catalysts may be used individually or in combinations of 2 or more. Preferred catalysts are the dialkyl tin dicarboxylates, dialkyl tin oxides, dialkyl bis(acetylacetonates), reaction products of dialkyltin oxide and phthalic acid esters or an alkane dione, dialkyltin halides and dialkyl tin oxides. Even more preferred catalysts are dibutyltin dilaurate, dimethyltin dilaurate, dibutyltin maleate, dibutyltin diacetate, tin octylate, tin naphthenate, reaction products of dibutyltin oxide and phthalic acid esters or pentanedione, dibutyl tin diacetylacetonate, dibutyltinoxide, dimethyl tin chloride and the like. The amount of catalyst used in the formulation is that amount which facilitates the cure of the adhesive without causing degradation of the adhesive after cure. The amount of catalyst in the adhesive formulation is preferably about 0.01 parts by weight or greater, more preferably about 0.1 parts by weight or greater, and most preferably about 0.2 parts by weight or greater, and preferably about 5 parts by weight or less, even more preferably about 1.0 parts by weight or less and most preferably about 0.4 parts by weight or less.

The adhesive composition further contains one or more titanates or zirconates having one or more ligands comprising hydrocarbyl phosphate esters and/or hydrocarbyl sulfonate esters. The titanates and zirconates enhance the speed of bonding to the coated substrate and speed of cure of the adhesive. The titanates and zirconates useful contain from about 1 to about 3 ligands comprising hydrocarbyl phosphate esters and/or hydrocarbyl sulfonate esters and about 1 to 3 hydrocarbyl ligands which may further contain unsaturation and heteroatoms such as oxygen, nitrogen and sulfur. Preferably the titanates and zirconates contain from about 2 to about 3 ligands comprising hydrocarbyl phosphate esters and/or hydrocarbyl sulfonate esters, preferably 3 of such ligands and about 1 to 2 hydrocarbyl ligands, preferably 1 hydrocarbyl ligand. Preferred zirconates and titanates correspond to Formula 6

$(R^3O)p—M—(OR^4)q$  Formula 6 wherein

M is separately in each occurrence Ti or Zr;

$R^3$ is separately in each occurrence a $C_1$ to $C_{12}$ alkyl group or a $C_{7-20}$ alkylaryl group which alkyl or alkylaryl groups may optionally contain one or more oxygen atoms or unsaturation;

$R^4$ is separately in each occurrence;

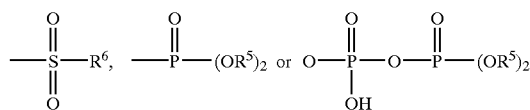

$R^5$ is separately in each occurrence a $C_1$ to $C_{12}$ alkyl group or a $C_{7-12}$ alkylaryl group;

$R^6$ is separately in each occurrence a $C_1$ to $C_{12}$ alkyl or $C_{7-20}$ alkylaryl group;

p is separately in each occurrence 1 or 2; and q is separately in each occurrence 2 or 3.

Preferably M is Ti. More preferably, $R^3$ is separately in each occurrence propyl or a group corresponding to the formula

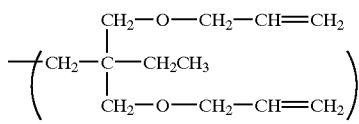

More preferably, $R^4$ is separately in each occurrence

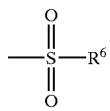

$R^5$ is separately in each occurrence $C_1$–$C_{12}$ alkyl, more preferably $C_{8-10}$ alkyl and most preferably octyl.

$R^6$ is separately in each occurrence a $C_{12-20}$ alkylaryl group, and more preferably $R^6$ is

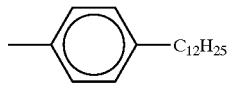

Preferably p is separately in each occurrence 1 or 2; and most preferably 1. Preferably, q is separately in each occurrence 2 or 3, and most preferably 3. Preferred titanates and zirconates include isopropyl tri(dioctyl)pyrophosphato titanate (available from Kenrich Chemicals under the designation KR38S), neopentyl(diallyl)oxy, tri(dodecyl)benzenesulfonyl titanate (available from Kenrich Chemicals under the designation LICA 09), neopentyl (diallyl)oxy, trioctylphosphato titanate (available from Kenrich Chemicals under the designation LICA 12), neopentyl (diallyl)oxy, tri(dodecyl)benzene-sulfonyl zirconate (available from Kenrich Chemicals under the designation NZ 09), neopentyl (diallyl)oxy, tri(dioctyl)phosphato zirconate (available from Kenrich Chemicals under the designation NZ 12), neopentyl (diallyl)oxy, tri(dioctyl)pyro-phosphato zirconate (available from Kenrich Chemicals under the designation NZ 38), The most preferred titanate is tri(dodecyl)benzene-sulfonyl titanate (available from Kenrich Chemicals under the designation LICA 09). The titanates are preferred over the zirconates. The titanate or zirconate is present in sufficient amount to enhance the speed of bonding (link up) to the coated substrate and the speed of cure of the adhesive. The titanate is present in an amount of about 0.05 parts by weight based on the weight of the adhesive or greater, more preferably 0.1 or greater and most preferably 0.2 parts by weight or greater. The titanate is present in an amount of 0.5 parts by weight based on the weight of the adhesive or less, more preferably 0.4 parts by weight or less and most preferably 0.3 parts by weight or less.

The adhesive composition further comprises an anhydrous strong organic acid which is miscible with the polymer and which enhances the bonding of the adhesive to an unprimed coated substrate. Miscible with the polymer means that the organic acid easily mixes with the polymer. Anhydrous as used in this context refers to materials which contain no more than trace amounts of water, particularly the amount of water is less than that amount which causes the polymer to undergo significant curing. The level of curing can be measured by the viscosity growth of the adhesive. Preferably the viscosity growth in storage, in an inert essentially water free environment, over a period of 3 days at 54° C. is less than about 50 percent, preferably less than about 30 percent and preferably less than about 20percent.

In a preferred embodiment the strong organic acid is an organic sulfonic acid or an organic phosphoric acid. Preferably the sulfonic acid corresponds to the Formula 7

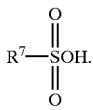

Formula 7

Preferably the phosphoric acid corresponds to the Formula 8

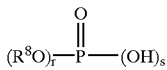

Formula 8 wherein
$R^7$ is separately in each occurrence a $C_{1-12}$ alkyl or $C_{7-30}$ alkylaryl group.
$R^8$ is separately in each occurrence $C_{1-10}$ alkyl; $C_{6-12}$ aryl or $C_{6-12}$ alkyl substituted aryl.
r is separately in each occurrence 1 or 2.
s is separately in each occurrence 1 or 2 the sum of r and s is 3.

Preferably $R^7$ is separately in each occurrence an alkyl substituted benzyl or an alkyl substituted napthyl. Preferably r is 2. Preferably s is 1. Preferably $R^8$ is separately in each occurrence phenyl, butyl or methyl. Preferred sulfonic acids are dodecyl benzene sulfonic acid, dinonylnaphthalene sulfonic acid and p-toluene sulfonic acid. A more preferred sulfonic acids is dodecyl benzene sulfonic acid. Preferred phosphoric acids are dibutyl phosphate, and diphenyl phosphate.

The organic acid is present in a sufficient amount that the adhesive composition is capable of bonding to coated substrates without the need for a primer having been preapplied. The organic acid is present preferably in an amount of about 0.1 part by weight based on the adhesive weight or greater, and most preferably about 0.2 parts by weight or greater. Preferably, the organic acid is present in an amount of about 1.0 parts by weight or less, more preferably about 0.8 parts by weight or less and most preferably about 0.6 parts by weight or less.

The adhesive composition of the invention may further comprise compounds having isocyante and hydrolyzable silicone moieties. These compounds are present in sufficient amount to achieve adhesion to desired coating system. The isocyanato silanes useful are described by formula 5. Preferred isocyanato silanes include gamma-isocyanatopropyltrimethoxy silane, gamma-isocyanatopropylmethyldimethoxy silane, and gamma-isocyanatopropyltriethoxy silane. The isocyantosilanes are present preferably in an amount of about 3 parts by weight based on the weight of the adhesive or greater, more preferably about 3.5 parts or greater and most preferably about 5 parts or greater based on the weight of the adhesive. The isocyanto silanes are present in an amount of about 10 parts by weight based on the weight of the adhesive or less, more preferably about 8 parts by weight or less and most preferably about 6 parts by weight or less.

The composition may further comprise a silicone-containing dehydrating compound. U.S. Pat. No. 4,977,228 discloses silicon-containing dehydrating compounds at column 10 line 27 to column 11 line 12, incorporated herein by reference. The silicon-containing dehydrating compound having three or four hydrolyzable groups bonded to the silicon atom is used to improve the storage stability of the curable polymer composition of the present invention, namely, to prevent increase of viscosity or gelation during storage. The hydrolyzable group bonded to the silicon atom of the silicon-containing compound may be the same as described above in connection with the silicon-containing reactive group. Preferably, the hydrolyzable group of the dehydrating compound is more reactive than that of the silicon-containing reactive group. When the number of the hydrolyzable groups bonded to the silicon atom of the silicon-containing compound is less than 3, the storage stability is not sufficiently improved, since the hydrolyzable groups of the silicon-containing dehydrating compound preferentially react with water in the composition, whereby the storage stability of the composition is improved.

Preferably, silicon-containing dehydrating compounds of Formula 9:

$$R^9_{4-n}SiX_n \qquad \text{Formula 9}$$

wherein $R^9$ is a substituted or unsubstituted monovalent hydrocarbon group, and X is a hydrolyzable group provided that when two or more X are present, they may be the same or different, and n is 3 or 4. $R^9$ is preferably a substituted or unsubstituted monovalent hydrocarbon group having 1 to 18 carbon atoms. Specific examples of $R^9$ are substituted or unsubstituted alkyl groups (e.g. methyl, ethyl, vinyl, methacryloxypropyl, etc.), substituted or unsubstituted aryl groups (e.g. phenyl, methylphenyl, etc.) and the like. As the hydrolyzable group X, an alkoxy group is preferred. Specific examples of the silicon-containing dehydrating compound are trimethoxysilane, triethoxysilane, methyldimethoxysilane, methyltrimethoxysilane, ethyl silicate, methyltriethoxysilane, n-propyltrimethoxysilane, methyldiisopropenyloxysilane, methyltriisopropenoxysilane, phenyldimethoxysilane, phenyltrimethoxysilane, phenyltriethoxysilane, vinyltrimethoxysilane, vinyltriethoxysilane, γ-methacryloxypropyltrimethoxysilane, methyldiacetoxysilane, methyltriacetoxysilane, γ-amino-propyltrimethoxysilane, γ-aminopropyltriethoxysilane, γ-mercapto-propyltrimethoxysilane, γ-glycidoxypropyltrimethoxysilane, bis(dimethylketoximate)-methylsilane, bis(cyclohexylketoximate)methylsilane, etc. Among them, alkyltrimethoxysilanes and alkyltrimethoxyvinyl-silane, and trimethoxymethylsilane are preferable since they are easily available and have better dehydration effects.

The amount of the silicon-containing dehydrating compound is usually from about 0.01 to 30 parts by weight, preferably from about 0.1 to 10 parts by weight per 100 parts by weight of the total amount of the adhesive composition. When the amount of the silicon-containing dehydrating compound is less than the above lower limit, the storage stability of the curable polymer composition is not sufficiently improved, while when said amount is larger than the above upper limit, the curing rate of the composition decreases.

The adhesive composition may contain other additives commonly used in adhesives formulations as known to those skilled in the art. The adhesive of the invention may be formulated with fillers known in the art for use in adhesive compositions. By the addition of such materials, physical properties such as viscosity, flow rates, sag and the like can be modified. However, to prevent premature hydrolysis of the moisture sensitive groups of the prepolymer, it is preferable to thoroughly dry the fillers before admixture therewith.

Optional components of the adhesive of the invention include reinforcing fillers. Such fillers are well-known to those skilled in the art and include carbon black, titanium dioxide, calcium carbonate, surface treated silica, titanium oxide, fumed silica, and talc. Preferred reinforcing fillers comprise carbon black. In one embodiment, more than one reinforcing filler may be used, of which one is carbon black, and a sufficient amount of carbon black is used to provide the desired black color to the adhesive. Preferably the only reinforcing filler used is carbon block. The reinforcing fillers are used in sufficient amount to increase the strength of the adhesive and to provide thixotropic properties to the adhesive. Preferably the reinforcing filler is present in an amount of about 1 part by weight of the adhesive composition or greater, more preferably about 15 parts by weight or greater and most preferably about 20 parts by weight or greater. Preferably the reinforcing filler is present in an amount of about 40 parts by weight of the adhesive composition or less, more preferably about 35 parts by weight or less and most preferably about 33 parts by weight or less.

Among optional materials in the adhesive composition are clays. Preferred clays useful in the invention include kaolin, surface treated kaolin, calcined kaolin, aluminum silicates and surface treated anhydrous aluminum silicates. The clays can be used in any form which facilitate formulation of a pumpable adhesive. Preferably the clay is in the form of pulverized powder, spray dried beads or finely ground particles. Clays may be used in an amount of about 0 part by weight of the adhesive composition or greater, more preferably about 1 part by weight or greater and even more preferably about 6 parts by weight or greater. Preferably the clays are used in an amount of about 20 parts by weight or less of the adhesive composition and more preferably about 10 parts by weight or less.

The adhesive composition of this invention may further comprise plasticizers so as to modify the rheological properties to a desired consistency. Such materials are preferably free of water, inert to reactive groups and compatible with the polymer used in the adhesive. Suitable plasticizers are well-known in the art and preferable plasticizers include alkyl phthalates, such as dialkyl phthalate, partially hydrogenated terpene, commercially available as "HB-40"; trioctyl phosphate; epoxy plasticizers; toluene-sulfamide; chloroparaffins; adipic acid esters; castor oil; toluene; xylene; n-methylpyrolidinone; and alkyl naphthalenes. The preferred plasticizers are the phthalates. The more preferred plasticizers are the dialkyl phthalates. Preferably, the alkyl groups are linear. More preferred are phthalates wherein the alkyl group is mixed linear $C_7$, $C_9$ and $C_{11}$, diisononyl phthalate and diisododecyl phthalate. Most preferred are phthalates wherein the alkyl group is a mixed linear $C_7$, $C_9$ and $C_{11}$ alkyl; diisononyl phthalate and diisodecyl phathalate. The amount of plasticizer in the adhesive composition is that amount which gives the desired rheological properties, which is sufficient to disperse the catalyst and other components in the system and to give the desired viscosity. The amounts disclosed herein include those amounts added during preparation of the prepolymer and during compounding of the adhesive. Preferably plasticizers are used in the adhesive composition in an amount of about 0 part by weight or greater based on the weight of the adhesive composition, more preferably about 5 parts by weight or greater, even more preferably about 10 parts by weight or greater and most preferably about 20 parts by weight or greater. The plasticizer is preferably used in an amount of about 45 parts by weight or less based on the total amount of the adhesive composition, more preferably about 40 parts by weight or less, even more preferably about 30 parts by weight or less and most preferably about 25 parts by weight or less.

Optionally, the adhesive composition may further comprise a thixotrope. Such thixotropes are well-known to those skilled in the art and include alumina, limestone, talc, zinc oxides, sulfur oxides, calcium carbonate, perlite, slate flour, salt (NaCl), and cyclodextrin. The thixotrope may be added to the adhesive of the composition in a sufficient amount to give the desired rheological properties. Preferably the thixotrope is present in an amount of about 0 part by weight or greater based on the weight of the adhesive composition, and preferably about 1 part by weight or greater. Preferably the optional thixotrope is present in an amount of about 10 parts by weight or less based on the weight of the adhesive composition and more preferably about 2 parts by weight or less.

As used herein, all parts by weight relative to the components of the adhesive composition are based on 100 total parts by weight of the adhesive composition and all percentages by weight are based on the weight of the adhesive composition. The sealant composition of this invention may be formulated by blending the components together using means well-known in the art. Generally the components are blended in a suitable mixer. Such blending is preferably conducted in an inert atmosphere and in the absence of atmospheric moisture to prevent premature reaction. It may be advantageous to add any plasticizers to the reaction mixture for preparing the prepolymer so that such mixture may be easily mixed and handled. Alternatively, the plasticizers can be added during blending of all the components. Once the sealant composition is formulated, it is packaged in a suitable container such that it is protected from atmospheric moisture. Contact with atmospheric moisture could result in premature cross-linking of the prepolymer.

The adhesive composition of the invention is used to bond porous and nonporous substrates together. The sealant composition is applied to the glass surface or the other substrate, preferably the glass surface, and is thereafter contacted with a second substrate. Thereafter the adhesive is exposed to curing conditions. In a preferred embodiment the other substrate is a plastic, metal, fiberglass or composite substrate which may optionally be painted. This method is especially effective for substrates painted with an acid resistant paint. In preferred embodiments, the surfaces to which the adhesive is applied are cleaned prior to application, see for example, U.S. Pat. Nos. 4,525,511; 3,707,521 and 3,779,794, incorporated herein by reference. The glass is prepared by cleaning the surface to which the adhesive composition is to be applied. A solvent wipe can be used to do this. Generally a cloth or other device with an appropriate solvent is used to clean the surface. Thereafter a primer may be applied to the portion of the window to which the adhesive is to be applied. Glass primers and application methods for such primers are well-known in the art. Typically the primer is applied with a brush or by a robot. A primer is not necessary where the adhesive is formulated so as to eliminate the need for one. In a preferred embodiment of the invention, the substrate is a building or an automobile. The adhesive is preferably deposited as a bead on the portion of the glass to be bonded into the substrate. The bead can be deposited by any known method to those skilled in the art. In one embodiment, the bead can be deposited using a caulking gun or similar type of manual application device. In another embodiment, the bead may be deposited by an extrusion apparatus such as a robotic extrusion apparatus. The adhesive is located on the portion of the window which will be contacted with the structure into which it will be bonded. In one preferred embodiment, the adhesive is placed about the periphery of one face of the window. Typically the adhesive is in the form of a bead located about the periphery of the window. Preferably the bead is a profiled shape along the cross-sectional plane. In the embodiment where the glass is window glass designed for use in automobiles, the bead is applied to the portion of the glass to be contacted with the flange of the automobile window. The window can then be placed into the structure with the adhesive contacting both the window and the structure to which the window is to be bonded into. This contacting is performed by means well-known to those skilled in the art. In particular, the glass can be placed in the structure by hand, by the use of a robot and the like. Generally, the adhesives of the invention are applied at ambient temperature in the presence of atmospheric moisture. Exposure to atmospheric moisture is sufficient to result in curing of the adhesive. Curing may be further accelerated by applying heat to the curing sealant by any means known to one skilled in the art, for instance by convection heat, or microwave heating. Preferably the sealant of the invention is formulated to provide a working time of about 6 minutes or greater, more preferably about 10 minutes or greater. Preferably the working time is about minutes or less and more preferably about 12 minutes or less. Further, the adhesive of the invention demonstrates a lap shear according to the process described hereinafter after three days or curing at 23° C. and 50 percent relative humidity (RH) of about 360 psi (2.48 mPa) or greater and more preferably about 500 psi (3.45 mPa) or greater. Preferably the adhesives of the invention demonstrate a tack free time of 30 minutes or less.

Molecular weights as described herein are determined according to the following procedure: determined using the Waters Model 590 Gel Permeation Chromatograph. This unit is connected to a multiwave length detector and a differential refractometer to measure the elution volume. A column of styrogel is used for the size exclusion and it can determine molecular weights from 250 to 50,000. The molecular weight of the prepolymer is then determined by measuring the elution volume through this column using tetrahydrofuran as the eluting solvent. The molecular weight is then calculated from a calibration curve of molecular weight vs. elution volume obtained from a polystyrene polyethylene glycol column. The quoted molecular weights are weight average molecular weights unless otherwise specified.

Specific Embodiments

The following examples are provided to more fully illustrate the invention, and are not intended to limit the scope of the claim. Unless otherwise stated, all parts and percentages are by weight.

The following are tests used for the prepared sealants.

Quick Knife Adhesion Test

A 6.3 mm (width)×6.3 mm (height)×76.2 mm (length) size sealant bead is placed on 101.6 mm×101.6 mm piece of an acid resistant paint panel and the assembly is cured for a specific time in the condition of 23° C. and 50 percent relative humidity. The cured bead is then cut with a razor blade through to the painted surface at a 45 degree angle while pulling back the end of the bead at 180 degree angle. Notches are cut every 3 mm on the painted surface. The degree of adhesion is evaluated as adhesive failure (AF) and/or cohesive failure (CF). In case of adhesive failure, the cured bead can be separated from the painted surface, while in cohesive failure, separation occurs within the sealant bead as a result of cutting and pulling. The tested paint substrate can be used as supplied, or treated by wiping with isopropanol (IPA) or naphtha (NP).

Weatherometer

The Weatherometer (WOM) was operated according to SAE J1895 conditions. The samples were exposed continuously to the following cycles; 89° C. at 5 percent RH for 3.8 hours and 95 percent RH for 1 hour. The samples exposed to the WOM were tested according to the Lap Shear tests described hereinafter.

Lap Shear Test

A sealant approximately 6.3 mm wide by 8 mm high is applied along the width of the glass and approximately 6 mm to 12 mm from the primed end. The glass is treated by wiping a cloth containing 35518 primer available from the Dow Automotive business and of The Dow Chemical Company, wiping off the 35518 primer with a clean cloth and thereafter applying to the glass 35520A primer available from the Dow Automotive business unit of the Dow Chemical Company. The paint substrate is immediately placed on the sealant and the sample is allowed to cure at the condition of the 23° C. and 50 percent relative humidity for 7 days. The sample was then pulled at a rate of 1 inch/minute (2.5 cm/min) with an Instron Tester.

Examples 1 to 3

Moisture curable sealant compositions were prepared under anhydrous conditions by compounding silylated prepolymers described below with the components described below. The components, except carbon black, were charged to a 2 gallon planetary mixer and mixed for 20 minutes under vacuum, then dried carbon black was added and mixed for 20 minutes under vacuum. Finally, the adhesive was filled into plastic tubes.

The adhesive samples were adhered to substrates comprising coupons coated with DuPont silane urethane melamine coatings. Basecoat and clearcoat were sprayed on e-coated steel coupons and baked at 275° F. (135° C.) for 17 minutes in an oven. The coupons had 0.5 to 1.5 mils (0.13 to 0.4 mm) base coat and 0.8 to 2.0 mils (0.20 to 0.51 mm) of clearcoat. The adhesive samples were cured at 23° C. at 50 percent relative humidity for the times stated in the Tables that follow and then Quick Knife Adhesion was performed. The results are compiled in Table 1.

TABLE 1

| Component | Example 1 | Example 2 | Example 3 |
|---|---|---|---|
| SAX ® 400 Prepolymer | 48.10 | 38.0 | 40.0 |
| SAT 010 | | 12 | 10 |
| PLATINOL ® 711P Plasticizer | 16.85 | 17.8 | 16.2 |
| SILQUEST ® A-171 Stabilizer A | .20 | 0.30 | 0.30 |
| SILQUEST ® Y-5187 Adhesion Promoter | 3.5 | | |
| RAVEN ® 790 Carbon Black | 30.5 | 30.8 | 30.6 |
| TYZOR ® DC | | | 3.0 |
| LICA ® 09 | | 1.0 | |
| KR ® 38S | .20 | | |
| BAP | | 0.10 | 0.08 |
| DDBSA | .15 | | |
| DBP | .50 | | |
| Sum | 100 | 100 | 100 |
| Quick Knife after 2 days | 100% CF | 50%/50% CF/AF | 100% CF |
| Quick Knife after 5 days | 100% CF | 50%/50% CF/AF | 50%/50% CF/AF |

| *Ingredients Used | |
|---|---|
| SAX ® 400 Prepolymer | Trifunctional polypropyleneoxide polyether with dimethoxymethyl silyl terminal groups having a molecular weight of about 20,000 |
| SAT 010 Prepolymer | Difunctional polypropyleneoxide polyether with dimethoxymethyl silyl terminal groups MW~2000 |
| PALATINOL ® 711 P[1] Plasticizer | mixed alkyl branched phthalate plasticizer |
| SILQUEST ® Y 5187[2] Adhesion Promoter | Isocyanato propyl trimethoxysilane |
| RAVEN ® 790[3] | Carbon Black |
| LICA ® 09[4] | neopentyl (diallyl)oxy, tri(dodecyl)benzene-sulfonyl titanate (10 percent in 711P plasticizer) |
| KR ® 38S[4] | isopropyl tri(dioctyl)pyrophosphato titanate (10 percent in 711P plasticizer) |
| TYZOR ® DC[6] | Diisopropyl ethylacetoacetonate (10 percent in 711P plasticizer) |
| LICA ® 12[4] | neopentyl (diallyl)oxy, tri(octyl) phosphato titanate (10 percent in 711P plasticizer) |
| NZ ® 09[4] | neopentyl (diallyl)oxy, tri(dodecyl)benzene-sulfonyl zirconate (10 percent in 711P plasticizer) |
| NZ ® 12[4] | neopentyl (diallyl)oxy, tri(octyl) phosphato zirconate (10 percent in 711P plasticizer) |
| NZ ® 38[4] | isopropyl tri(dioctyl)pyrophosphato zirconate (10 percent in 711P plasticizer) |
| DBP | Dibutyl phosphate (10 percent in 711P plasticizer) |
| DDBSA | Dodecyl Benzene Sulfonic Acid (50 percent in N-methyl pyrrolidone) |
| DPP | Diphenyl phosphate |
| DNNSA | Dinonylnaphylene sulfonic acid |
| DABCO ® T12[5] | Dibutyl tin dilaurate |

[1]Trademark of BASF.
[2]Trademark of OSI Specialties.
[3]Trademark of Columbian Chemical Company.
[4]Trademark of Kenrich Chemicals.
[5]Trademark of Air Products Inc.
[6]Trademark of DuPont.

Examples 4 to 8

Several formulations were prepared as described above varying the titanate or zirconate used. The adhesives were coated on the panels prepared as described below cured for the time stated and the Quick Knife Adhesion test was performed on each sample. The panels were prepared as follows: 4 in×12 in (10.2 cm×30.5) E-coated panels were sprayed with PPG Carbamatee basecoat and clearcoat and baked at 285° F. (141° C.) for 30 minutes in an oven. The panels had 0.5–1.5 mil (0.13 to 0.40 mm) of basecoat and 0.8–2.0 mil (0.20 to 0.51 mm) of clearcoat. The adhesive samples were set up on the panel according to the Quick Knife Adhesion Test method and allowed to cure at 23° C. and 50 percent RH for the times stated in the table. The adhesion testing was performed as stated in the method. The results are compiled in Table 2.

TABLE 2

| Ingredients/Example | Catalyst Type | 4 | 5 | 6 | 7 | 8 |
|---|---|---|---|---|---|---|
| SAX ® 400 | | 48.000% | 48.000% | 48.000% | 48.000% | 48.000% |
| SILQUEST ® Y5187 | | 5.000% | 5.000% | 5.000% | 5.000% | 5.000% |
| PALATINOL ® 711P | | 17.550% | 17.550% | 17.511% | 17.382% | 17.382% |
| Carbon Black | | 29.000% | 29.000% | 29.000% | 29.000% | 29.000% |
| DDBSA | Acid | 0.250% | 0.250% | 0.250% | 0.250% | 0.250% |
| DBP | Acid | | | | | |
| LICA ® 9 | Titanium | 0.200% | | | | |
| LICA ® 12 | Titanium | | 0.200% | | | |
| LICA ® 38 | Titanium | | | 0.239% | | |
| NZ ® 09 | Zirconium | | | | 0.368% | 0.368% |
| NZ ® 12 | Zirconium | | | | | |
| SUM | | 100.000% | 100.000% | 100.000% | 100.000% | 100.000% |
| Adhesion Performance | | | | | | |
| 3 Day QKA | | 100% CF | 100% CF | 100% CF | 100% CF | 100% CF |
| 7 Day QKA | | 100% CF | 100% CF | 100% CF | 100% CF | 100% CF |

Table 2 shows that using either titanium or zirconium catalysts with sulfonate or phosphate ligands provide adhesion on PPG Carbamate® paint.

Examples 9–18

Several formulations were prepared and tested as described above using various organic acids. The formulations and results are compiled in Table 3.

TABLE 3

| Ingredients/Example | Catalyst Type | 9 | 10 | 11 | 12 | 13 |
|---|---|---|---|---|---|---|
| SAX ® 400 | | 48.000% | 48.000% | 48.000% | 48.000% | 48.000% |
| SILQUEST ® Y5187 | | 5.000% | 5.000% | 5.000% | 5.000% | 5.000% |
| SILQUEST ® A171 | | | | | | 0.200% |
| PALATINOL ® 711P | | 17.700% | 17.200% | 17.086% | 17.300% | 16.350% |
| Carbon Black | | 29.000% | 29.000% | 29.000% | 29.000% | 30.000% |
| LICA ® 09 | Titanium | 0.200% | 0.200% | 0.200% | 0.200% | 0.200% |
| DDBSA | Acid | 0.100% | | | | 0.250% |
| DNNSA (50% wt in Heptane) | Acid | | | 0.714% | 0.500% | |
| DPP | Acid | | 0.300% | | | |
| NMP | | | 0.300% | | | |
| SUM | | 100.000% | 100.000% | 100.000% | 100.000% | 100.000% |
| Adhesion Performance | | | | | | |
| CT Room OKA (3 Day) | | 100% CF | 60% 40% CF/AF | 100% CF | 100% CF | 100% CF |
| CT Room QKA (7 Day) | | 100% CF | 100% CF | 100% CF | 100% CF | 100% CF |
| SAX ® 400 | | 48.000% | 48.000% | 48.000% | 48.000% | 48.000% |
| SILQUEST ® Y5187 | | 5.000% | 5.000% | 5.000% | 5.000% | 5.000% |
| SILQUEST ® A171 | | | | | | 0.200% |
| PALATINOL ® 711P | | 17.700% | 17.200% | 17.086% | 17.300% | 16.350% |
| Carbon Black | | 29.000% | 29.000% | 29.000% | 29.000% | 30.000% |
| LICA ® 09 | Titanium | 0.200% | 0.200% | 0.200% | 0.200% | 0.200% |
| DDBSA | Acid | 0.100% | | | | 0.250% |
| DNNSA (50% wt in Heptane) | Acid | | | 0.714% | 0.500% | |
| DPP | Acid | | 0.300% | | | |
| NMP | | | 0.300% | | | |
| SUM | | 100.000% | 100.000% | 100.000% | 100.000% | 100.000% |
| Adhesion Performance | | | | | | |
| CT Room OKA (3 Day) | | 100% CF | 60% 40% CF/AF | 100% CF | 100% CF | 100% CF |
| CT Room QKA (7 Day) | | 100% CF | 100% CF | 100% CF | 100% CF | 100% CF |

Table 3 illustrates that formulas using phosphoric acids and organic sulfonic acids achieved primeness adhesion on PPG Carbamate® paint while formulas using acetic acids with different acid strengths showed no adhesion. Lower acid strength acid such as acetic acid, chloroacetic acid were also not able to cure the formulas under standard conditions (23° C./150 percent RH) in a timely manner, over a period of three to seven days.

Examples 19 to 20 and Comparative Example A

Three adhesives were prepared as described above using the ingredients disclosed in Table 4.

These adhesives and a polyurethane prepolymer based adhesive available from The Dow Chemical Company under the designation SKU 439 (Comparative A) were tested for adhesion to panels coated with DuPont Gen III® Acrylic Melamine Coating prepared as follows:

- 4×16 in (10 cm×40 cm) e-coated panels were sprayed with DuPont Gen III® basecoat (0.5–1.5 mil (0.13 to 0.4 mm) and clearcoat (0.8–20 mil) (0.20 mm–0.51 mm). The panels were baked in an oven for the specified time and temperature to mimic the target bake and overbake conditions.

The results are compiled in Table 5. In Table 5 target bake means exposure of the coated panel to 285° F. (141° C.) for 17 minutes and overbake means exposure to 290° F. (143°) for 4 hours.

TABLE 4

| | | Examples | | |
|---|---|---|---|---|
| Component | Catalyst Type | 19 | 20 | 1 |
| SAX ® 400 | | 49.10 | 48.85 | 48.10 |
| SILANE ® Y5187 | | 4.00 | 3.50 | 3.50 |
| SILANE ® A-171 | | 0.30 | 0.15 | 0.15 |

TABLE 4-continued

| | | Examples | | |
|---|---|---|---|---|
| Component | Catalyst Type | 19 | 20 | 1 |
| PALATINOL ® 711P | | 15.84 | 16.65 | 16.65 |
| Carbon Black | | 30.00 | 30.00 | 30.60 |
| PTSI | | | | 0.15 |
| NMP | | 0.30 | | |
| DDBSA | Acid | 0.15 | 0.15 | 0.15 |
| DPP | Acid | 0.30 | | |
| DBP | Acid | | 0.50 | 0.50 |
| KR ® 38S | Titanium | | 0.20 | 0.20 |
| DABCO ® T-12 | Tin | 0.01 | | |
| | | 100.00 | 100.00 | 100.00 |

TABLE 5

| | Target Bake | | Over Bake | |
|---|---|---|---|---|
| Example | 3 Days | 7 Days | 3 Days | 7 Days |
| Comp A | 0% CF | 0% CF | 0% CF | 0% CF |
| 19 | 100% CF | 100% CF | 0% CF | 85% CF |

TABLE 5-continued

| Example | Target Bake | | Over Bake | |
|---|---|---|---|---|
| | 3 Days | 7 Days | 3 Days | 7 Days |
| 20 | 50% CF | 100% CF | 0% CF | 90% CF |
| 1 | 20% CF | 100% CF | 0% CF | 40% CF |

Table 5 demonstrates that acid catalyzed formulas adhered to target baked Du Pont Gen III® acrylic melamine paint and also showed high degree of adhesion to overbaked Gen III paint. The polyurethane based product did not show adhesion to this paint system. Formulations of the invention can be adjusted to achieve good adhesion to overbaked paint.

The adhesives of Examples 13 and 20 were exposed to WOM conditions for 1000 and 2000 hours and then tested for lap shear strength as described above. For the adhesives of Example 20 the average lap shear strength of three replicate samples was 381 psi (2627 kPA), and for 2000 hour WOM was 495 (3413 kPA) psi with 100 percent cohesive failure of the adhesive samples. For the adhesive of Example 13 the 1000 hour result was 598 psi (4123 kPA) and the 2000 hour result was 475.70 psi (3280 kPA) with 100 percent cohesive failure of the adhesive samples.

Storage Stability

The stability of the adhesives of 13, 19 and 20 in storage in the absence of moisture is evaluated by determining the initial flow rate of an adhesive sample, determining its flow rate again after aging at 54° C. for three days in the absence of moisture, rand the ratio of the aged flow rate to the initial flow rate is calculated. The flow rate in each case is defined as the time in seconds required to extrude 20 grams of the sample through an orifice 0.157 inch (0.4 cm) in diameter under the pressure of 80 psi (552 kPa). The flow rate ratio would ideally be 1, indicating good storage stability of the sample. Conversely, flow rate ratio significantly greater than 1.3 indicates an unstable sample, and a lack of shelf stability in the absence of the water. Flow rate ratio of 1.0 to 1.3 is considered acceptable. The results are compiled in Table 6.

TABLE 6

| Example | Flow rate Ratio |
|---|---|
| Example 19 | 1.24 |
| Example 20 | 1.0 |
| Example 13 | 1.07 |

What is claimed is:

1. An adhesive composition comprising
   one or more polymers having a flexible backbone and silane moieties capable of silanol condensation;
   one or more titanates or zirconates having one or more ligands comprising a hydrocarbyl phosphate ester, a hydrocarbyloxy phosphate ester, or a hydrocarbyl sulfonate ester;
   an anhydrous strong organic acid which is miscible with the polymer and enhances the bonding of the adhesive to a coated unprimed substrate.

2. An adhesive composition according to claim 1 which further comprises one or more organotin catalysts.

3. An adhesive according to claim 2 wherein the acid is an organic phosphoric acid or organic sulfonic acid.

4. An adhesive according to claim 3 wherein the titanate or zirconate corresponds to the formula $$(R^3O)_p\text{—}M\text{—}(OR^4)_q$$

wherein
   M is separately in each occurrence Ti or Zr;
   $R^3$ is separately in each occurrence is $C_{1-12}$ alkyl or $C_{7-12}$ alkylaryl;
   $R^4$ is separately in each occurrence

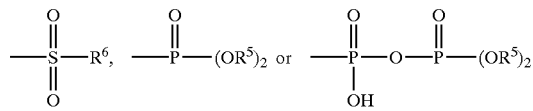

$R^5$ is separately in each occurrence $C_{1-12}$ alkyl;
   $R^6$ is separately in each occurrence a $C_{1-12}$ alkyl or $C_{7-20}$ alkylaryl group;
   p is separately in each occurrence 1 or 2; and
   q is separately in each occurrence 2 or 3.

5. An adhesive composition according to claim 4 wherein M is Ti.

6. An adhesive composition according to claim 5 wherein the sulfonic acid corresponds to the formula

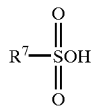

and the phosphoric acid corresponds to the formula

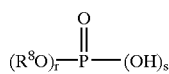

wherein
   $R^7$ is separately in each occurrence a $C_{1-12}$ alkyl or $C_{7-30}$ alkylaryl group;
   $R^8$ is separately in each occurrence $C_{1-10}$ alkyl; $C_{6-12}$ aryl or $C_{6-12}$ alkylaryl;
   r is separately in each occurrence 1 or 2;
   s is separately in each occurrence 1 or 2
wherein the sum of r and s is 3.

7. An adhesive composition according to claim 6 comprising
   A) from about 30 to about 99.8 parts by weight of one or more silane functional polymers;
   B) from about 0.05 to about 0.5 parts by weight of one or more organo titanates or zirconates; and
   C) from about 0.1 to about 0.45 parts by weight of one or more strong organic acids wherein the total parts by weight is 100.

8. An adhesive according to claim 7 wherein the silane functional polymer has a backbone is a polyolefin, polyurethane, polyester or polyether.

9. A method of bonding glass to a painted substrate without utilizing a primer on the painted substrate which comprises
   A) applying an adhesive according to claim 1 to either of glass or the unprimed painted substrate;
   B) contacting the glass and the unprimed painted substrate such that the adhesive is disposed between the painted substrate and the glass; and
   C) allowing the adhesive to cure to bond the glass to the painted substrate.

10. A method according to claim 9 wherein the painted substrate is the flange of an automobile adapted for holding a glass window into the automobile.

11. A method according to claim 1 wherein the acid is an organic phosphoric acid or organic sulfonic acid.

12. A method according to claim 11 wherein the titanate or zirconate corresponds to the formula $$(R^3O)_p-M-(OR^4)_q$$

wherein

M is separately in each occurrence Ti or Zr;

$R^3$ is separately in each occurrence is $C_{1-12}$ alkyl or $C_{7-12}$ alkylaryl;

$R^4$ is separately in each occurrence

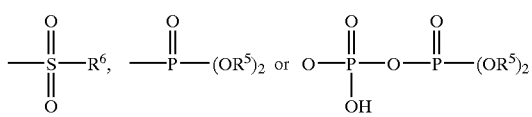

$R^5$ is separately in each occurrence $C_{1-12}$ alkyl;

$R^6$ is separately in each occurrence $C_{1-12}$ alkyl or $C_{7-20}$ alkylaryl;

p is separately in each occurrence 1 or 2; and q is separately in each occurrence 2 or 3.

13. A method according to claim 12 wherein M is Ti.

14. A method according to claim 13 wherein the sulfonic acid corresponds to the formula

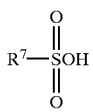

and the phosporic acid corresponds to the formula

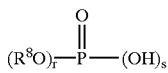

wherein $R^7$ is separately in each occurrence $C_{7-12}$ alkylaryl;

$R^8$ is separately in each occurrence $C_{1-10}$ alkyl, $C_{6-12}$ aryl or $C_{7-12}$ alkylaryl;

r is separately in each occurrence 1 or 2;

s is separately in each occurrence 1 or 2;

wherein the sum of r and s is 3.

15. A method according to claim 14 wherein the adhesive comprises

A) from about 30 to about 99.8 parts by weight of one or more silane functional polymers;

B) from about 0.05 to about 0.5 parts by weight of one or more organo titanates or zirconates; and C) from about 0.1 to about 0.45 parts by weight of one or more strong organic acids; wherein the total parts is 100.

16. A method according to claim 15 wherein the silane functional polymer has as a backbone a polyolefin, polyurethane, polyester or polyether.

* * * * *